United States Patent [19]

Goetz

[11] 4,109,578
[45] Aug. 29, 1978

[54] FLUID GENERATOR

[75] Inventor: George W. Goetz, Detroit, Mich.

[73] Assignee: Eaton Corporation, Cleveland, Ohio

[21] Appl. No.: 769,749

[22] Filed: Feb. 17, 1977

Related U.S. Application Data

[63] Continuation of Ser. No. 591,910, Jun. 30, 1975, abandoned.

[51] Int. Cl.² ............................................. B60R 21/08
[52] U.S. Cl. ...................................... 102/39; 280/741
[58] Field of Search .................. 102/39; 280/728-742; 23/28

[56] References Cited

U.S. PATENT DOCUMENTS

| 2,997,165 | 8/1961 | Leuthey et al. | 102/70 R |
|---|---|---|---|
| 3,696,749 | 10/1972 | Scanlon | 102/49.7 |
| 3,865,660 | 2/1975 | Lundstrom | 280/741 X |
| 3,877,882 | 4/1975 | Lette | 102/39 |
| 3,880,447 | 4/1975 | Thorn et al. | 102/39 |
| 3,895,098 | 7/1975 | Pretz | 149/35 |
| 3,904,221 | 9/1975 | Shiki et al. | 102/39 |
| 3,985,076 | 10/1976 | Schneiter | 102/39 |

Primary Examiner—Harold Tudor
Attorney, Agent, or Firm—R. A. Johnston

[57] ABSTRACT

A device for generating pressurized fluid for inflating inflatables such as for a vehicle occupant restraint. The present generator is of the combustible chemical type having a tubular housing with radial flow discharge port means. Combustible chemical gas generating material is disposed within the housing and annularly about a central thin wall tubular casing. Longitudinally fast-burning booster charge means is disposed within the central casing and is ignited at one end of the casing. Upon ignition, the booster charge burns progressively along the length of the tubular casing causing progressive longitudinal rupture for nearly instantaneous ignition of the portions of the gas generating material adjacent the casing. The resultant substantially instantaneous ignition of the gas generating material along the full length thereof produces uniform radial burning of the gas generating material.

22 Claims, 5 Drawing Figures

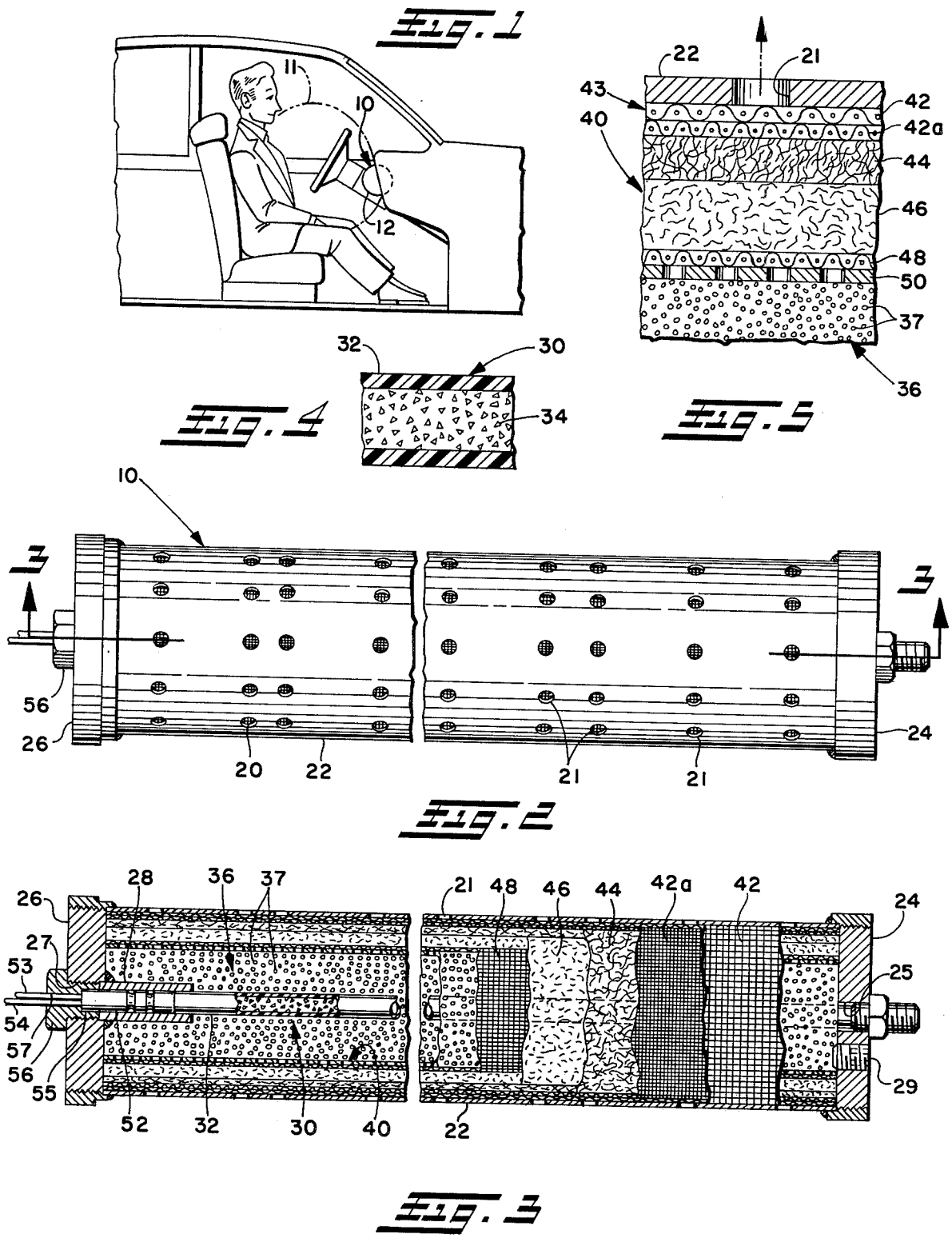

FLUID GENERATOR

This is a continuation of application Ser. No. 591,910, filed June 30, 1975, now abandoned.

BAKCGROUND OF THE INVENTION

Vehicle occupant collision restraints of the passive type employ an expandable confinement or cushion inflated from a fluid supply activated by a signal from a collision sensor mounted on the vehicle. The fluid supply for inflating the confinement may be of any of several varieties including a reservoir containing pressurized fluid, a combustible chemical fluid generator, or a hybrid supply containing a combination of both of these techniques. Of these three types of fluid supplies, it has been found most economical to design the occupant restraint system about a fluid supply which utilizes chemical combustion for generating the inflating fluid. Chemical combustion fluid generators permit the most compact and lightweight designs, and thus lend themselves most readily to convenient attachment to structural portions of the vehicle.

In designing fluid supplies for inflatable vehicle occupant restraint systems, chemical combustion gas generators have been found particularly convenient and suitable for use with the inflatable driver restraint. The relatively smaller size of the inflatable confinement used for restraining the vehicle driver requires an amount of inflating gas which can readily be supplied by a small chemical combustion generator containing fuel and oxidizer within a housing having dimensions which permit ready attachment to the hub region of the steering wheel. Thus chemical combustion fluid generators have been widely considered as a source of inflating fluid for the driver restraint or cushion.

However, in providing an inflatable confinement of suitable size for adequately restraining the vehicle passengers laterally adjacent the driver in the forward seating position, a confinement is required which has a substantially larger volume than that of the inflatable cushion used to restrain the driver. Therefore, substantially more inflating fluid and thus more combustible chemical material is required to provide the necessary amount of fluid for inflating the larger confinement. A chemical gas generator is required which will ignite all the increased amount gas generating material contained therewithin in a few milliseconds. In order that combustion of all of the gas generating material will occur in a sufficiently short length of time to fully inflate the larger confinement, that is, in an elapsed time of approximately 50 milliseconds from receipt of the collision signal, the larger amount of combustible material must be ignited substantially instantly as compared to the 50 milliseconds.

It has been found desirable to utilize a generally cylindrically shaped radial flow combustible chemical gas generator for inflating the confinement on the passenger side of the forward seating position in the vehicle. The radial flow design enables the use of a cylindrical diffuser for diffusing the gas before entering the confinement. Such a cylindrical generator-diffuser arrangement is readily adaptable for recessing within, and attachment to, the dashboard portions of the vehicle structure. However, it has been found difficult to provide a gas generator of radial flow construction for use with a cylindrical diffuser which could be readily ignited by a single initiator at one end thereof and yet burn in a manner so as to provide uniform fluid flow lengthwise along the generator and therefore provide complete combustion of all the necessary combustible chemical material in the required short duration of time.

SUMMARY OF THE INVENTION

The present invention provides a solution to the above-described problem of designing a radial flow gas generator for inflating a confinement employed in a vehicle occupant restraint system.

The present invention provides a chemical combustion gas generator having the gas generating material disposed in annular arrangement within a tubular housing means which has port means for providing radial fluid discharge. A longitudinally, or linearly, burning booster charge means is disposed within rupturable casing means located centrally within the gas generating material. An initiator responsive to a collision signal ignites the booster means at one end thereof such that the casing means ruptures progressively longitudinally as the booster charge means burns progressively the length of the casing, thus igniting substantially instantaneously the region of gas generating material immediately adjacent and surrounding the casing means. The annularly disposed gas generating material is thus caused to burn substantially instantaneously along the entire length thereof radially outwardly from its central core region to provide uniform radial discharge of the generated inflation fluid substantially uniformly along the length of the tubular housing means. The tubular housing means has filter means disposed therewithin in the flow path of discharge port means.

BRIEF DESCRIPTION OF THE DRAWINGS

FIG. 1 is a side view of a portion of a vehicle with the fluid generator mounted to the dashboard and with the inflated confinement shown in phantom outline;

FIG. 2 is a view showing the exterior of the housing means of the fluid generator of the present invention;

FIG. 3 is a section view taken along section indicating lines 3—3 of FIG. 2;

FIG. 4 is an enlarged view of a fragmentary portion of FIG. 3 and shows the details of construction of the booster charge means; and FIG. 5 is an enlarged view of a fragmentary portion of FIG. 3 and shows the details of construction of the filter means.

DETAILED DESCRIPTION

With reference to FIG. 1, the fluid generating means indicated generally at 10, is shown installed on the dashboard of a vehicle with the longitudinal dimension thereof of the generator disposed transversely of the vehicle, or along the dashboard. A diffuser means 12 is shown concentrically surrounding the fluid generator for diffusing fluid flow into the confinement, which is usually stored in a collapsed condition about the diffuser means. The confinement 11 is illustrated in phantom outline in FIG. 1 in the inflated condition.

Referring now to FIG. 2, the fluid generating means 10 in the form shown as having an elongated housing 22 defining discharge port means 20 preferably in the form of a plurality of equally spaced circumferentially disposed apertures 21 provided in the wall of the housing means. The housing means may have any convenient proportions and dimensions suitable for mounting in a particular vehicle. However, in the presently preferred practice, the housing means is of tubular form having the length thereof at least four times the largest transverse dimension and is preferably of cylindrical form. In one present embodiment of the invention, the housing means has a length of 61 centimeters and a diameter of 7 centimeters. The housing means 22 has attached thereto at each end a closure cap, indicated by numerals 24 and 26 respectively, for sealing the ends of the housing means. The end cap 26 shown at the left-hand end of the housing means 22 in FIGS. 2 and 3 has attached thereto a guide tube 28 having one end thereof attached to the inner face of the end cap 26, for example, as by welding. The tube 28 is located in the center of the end cap 26 which has a threaded aperture 27 provided therein which communicates with the bore of tube 28 from the exterior face of the cap 26.

Referring now to FIGS. 3 and 4, booster charge means, indicated generally at 30, is disposed centrally and coaxially within the interior of the housing means 22. The booster charge means includes a tubular casing means 32 having a wall generally thin with respect to the transverse dimension thereof and having one end thereof received in the bore of guide tube 28. The remaining end of the casing 32 is received in a central bore 25 provided through the end cap 24. The tubular casing means is formed of a rupturable or frangible material, such as kraft or bond paper, but preferably a substantially unplasticized polyester plastic, and has the interior thereof filled with relatively fast burning but non-detonating granular combustible chemical primer or booster material 34. The booster charge means 30 may contain any relatively fast-burning but non-detonating materials known in the art which do not yield any appreciable carbon monoxide. However, the booster charge means must be capable of burning along the length of the casing 32 at a rate of at least 50 meters/second and preferably greater than 100 meters/second. For this purpose, granulated sodium azide $NaN_3$ fuel with an oxidizer of granulated potassium perchlorate $KClO_4$ has been found particularly suitable for the primer or booster material. In the presently preferred practice of the invention the granulated booster material has granules sized in the range 14 – 28 mesh; that is, the granules will pass through a 14 mesh screen but not a 28 mesh screen. As referred to herein, mesh size will be understood to mean the mesh number designation established by the U.S. National Bureau of Standards, for a U.S. Standard Testing Sieve, Market Grade Series.

An initiator means, preferably in the form of an electrically actuated igniter 52 or squib, is provided adjacent one end of the casing 32 as shown in FIG. 3. The igniter 52 has a pair of leads 53 and 54 extending therefrom which leads are received through a central bore 57 provided in a threaded plug 56 with the end of the igniter 52 received in a counterbore 55 provided in the threaded end of plug 56. In the presently preferred practice of the invention, the igniter 52 is cemented into the counterbore 55 with any suitable electrically insulating cement or potting compound as, for example, an epoxy resin or room-temperature vulcanizing sealant. The subassembly of the initiator 52 and threaded plug 56 may then be conveniently received through the aperture 27 of end cap 26 with the free end of the initiator 52 lodged in the bore of guide 28. The plug 56, with the igniter assembled thereto may then be installed and secured in the end cap and, in this regard, is preferably threadedly engaged with corresponding threads provided in the aperture 27 to secure and retain the initiator 52 in the bore of guide 28; such that, the end of the initiator 52 makes contact with the end of casing means 32 and is pressed against the granulated booster charge material 34 within the casing means.

Preferably, each of the end caps 24 and 26 comprises an outer portion which is secured to the housing 22 as, for example, by welding, and an inner plug portion threadedly received in the outer ring. This arrangement permits removal of the plug portion of either of the end caps for ease of manufacture and assembly. The end cap 24 has a filling plug 29 provided in the central plug region thereof which filling plug is removable for loading the sustaining charge gas generating material hereinafter described, into the housing after assembly of the end caps to tubular housing means 22.

Filter means, indicated generally at 40, has been found desirable and is provided on the inner periphery of the tubular housing means 22 and is disposed in the flow path of each of the discharge ports 21. The filter means employed in the present fluid generator is preferably of the type described in my copending application filed concurrently herewith and entitled: FILTER FOR GAS GENERATOR AND METHOD OF MAKING SAME, Ser. No. 59,191, now U.S. Pat. No. 4,012,211, which application is assigned to the assignee of the present application. Referring to FIG. 5, the filter means 40, as it is employed in the present invention, is disposed adjacent and upstream of and may include integrally therewith, means 43 defining a plenum zone for permitting axial cross flow of the gas to the ports 21. The plenum means 43 includes a layer of coarse screen 42 of preferably 6 – 8 mesh disposed immediately adjacent the inner periphery of the tubular housing 22 so as to cover each of the discharge port means 21. If desired, the plenum means 43 may include a second layer of the same or slightly finer screen 42a disposed radially inwardly and adjacent screen 42, the choice being determined by the number and location of the discharge ports 21. Where the housing 22 is provided with only a few discharge ports, as where the discharge ports are arranged around only a portion of the circumference of the housing, for example, to direct the gas flow to an aspirating diffuser, the plenum means having a dual layer of screens has been found to provide better plenum action in permitting less restricted axial cross flow to the discharge ports. However, where the discharge ports are disposed over the complete circumference of the housing 22, or where the spacing between ports is small, a single layer of screen 42 has been found satisfactory to provide sufficient plenum zone area to permit adequate axial cross flow of the gases to the discharge ports 21.

Adjacent the plenum means 43 and radially inwardly thereof is an annular layer of fiberglas material 44 having disposed radially inwardly thereof, and next adjacent thereto in annular arrangement, a layer of steel wool material 46. Disposed radially inwardly in annular arrangement adjacent the inner periphery of the steel wool layer 46 is a layer of fine mesh screen 48 which is supported on the radially inner periphery thereof by an annular layer of perforated plate 50. In the presently preferred practice, the screen 48 may have a mesh size in the range 100–200. The plate 50 thus forms the radially inner periphery of the filter means 40. Although a particular form of construction of the filter means 40 is described and illustrated herein, it will be understood that other arrangements of the filter may be utilized, a particularly suitable arrangement being that described in my aforesaid referenced application, Ser. No. 591,911, filed concurrently herewith.

Referring to FIGS. 3 and 4, sustaining charge means 36, as mentioned hereinabove, is disposed within housing means 22 and in annular arrangement intermediate the booster casing 32 and the perforated plate 50 of the filter means. The sustaining charge means 36 includes granulated material 37 of a type which burns upon ignition to form a residue of solid porous sinters. The sustaining charge means 36 is packed prior to ignition to a suitable bulk density such that the entire periphery of the booster casing 32 is contacted by granules of the gas generating material 37. In the presently preferred practice of the invention, the sustaining charge means 36 has granules 31 sized at least twice as large as the granules of the booster charge means, and preferably in the range 6 – 8 mesh. In the presently preferred practice of the invention, the granulated material 37 comprises granules of an alkali metal azide gas generating composition, but any other suitable composition may be used which produces, upon combustion, solid porous sinter residue and a non-toxic gas. A particularly suitable composition is described in my copending U.S. patent application, AZIDE GAS GENERATING COMPOSITION, Ser. No. 528,199, filed Nov. 29, 1974 and assigned to the assignee of the present invention. The arrangement of the booster charge means of the present invention permits convenient and safe assembly of the generator by first attaching one end cap, for example, cap 26 may be first assembled to the housing 22 and casing means 32 installed in its central position. The sustaining charge granular material 37 may then be filled around casing 32 through the remaining open end of the housing and the open end then closed by assembly of remaining end cap 24. The primer material may then be loaded through hole 55 in the end cap 26 and through the hollow guide tube 28 into the casing 32. The igniter plug subassembly may then be installed. This arrangement thus permits completion of handling and loading of the sustaining charge before loading of the primer and thus results in a safe procedure for assembly.

The present invention thus provides a chemical combustion fluid generator for an inflatable vehicle occupant restraint, which generator, upon activation, discharges inflating fluid in a radial flow pattern from a housing means. The housing means is preferably tubular and generally cylindrically shaped and has a length in the order of at least four times the largest transverse dimension thereof to provide a configuration readily adaptable for mounting on the dashboard of a vehicle. In order that the sustaining charge means 36, disposed within the housing means 22, by substantially instantaneously ignited along the entire length thereof, the present invention employs a booster charge means disposed within a tubular casing means centrally within the housing means and sustaining charge means. The booster means, upon activation at one end thereof, burns rapidly and progressively ruptures the casing means along the full length thereof so as to ignite the sustaining charge means along the entire length thereof to begin radial burning of the gas generating material substantially instantaneously along the entire length of the housing means. Thus the fluid generator of the present invention is of the type having a generally elongated cylindrical configuration which is ignited at one end thereof, but burns in a manner to give substantially uniform radial discharge of the generated fluid along its entire length.

The present invention thus provides a unique fluid generator for a vehicle occupant restraint system which is shaped conveniently for mounting in a vehicle dash and which is adapted for connection at only one end thereof for communication with a collision sensitive activating means. The present invention has been described in the presently preferred form; however, it will be understood to those having ordinary skill in the art that modifications and variations of the invention may be made without departing from the scope of the invention which is more particularly described in the following claims.

What is claimed is:

1. A device for producing inflating fluid for use with an inflatable occupant restraint in a vehicle, said device comprising:
   (a) elongated housing means including means defining a plurality of radial flow fluid discharge ports distributed along substantially the length of said housing means;
   (b) gas generating means disposed within said housing means, said generating means including,
       (i) booster charge means including a first combustible chemical material;
       (ii) elongated casing means disposed within said housing means, and having said booster charge means disposed therewithin and in direct contact with the internal surface thereof, said casing means comprising an elongated tubular member extending substantially the full length of said elongated housing means, said tubular member having the wall thereof thin with respect to the smallest transverse dimension thereof; and formed of frangible material;
       (iii) sustaining charge means including a second combustible chemical material capable of producing a compressible fluid upon ignition by said booster charge means, said sustaining charge means being disposed in annular arrangement about said casing means, said second combustible material having a burn rate substantially slower than the burn rate of said first chemical material, said second combustible material being formed of granules which, upon ignition by said booster means, burn so as to form a residue of solid porous sinters, and said annular sustaining means burns to discharge fluid outwardly through said discharge ports;
   (c) means within said housing means defining an annular plenum zone communicating with each of said fluid ports, with said plenum zone being disposed about and receiving the fluid discharge from said sustaining charge means;
   (d) initiator means disposed adjacent one end of said casing means for igniting said booster charge means, whereupon activation of said initiator means, said booster charge means ignites and progressively ruptures said casing means along the length thereof and progressively longitudinally ignites the portions of said sustaining charge means adjacent said sustaining charge means adjacent said casing means for radially outward burning of said sustaining charge means; and
   (e) connector means adapted for connecting said initiator means to a source of activation.

2. The device defined in claim 1, wherein said booster charge means burns, upon activation of said initiator means, longitudinally along said casing means at a rate of not less than 50 meters per second.

3. The device defined in claim 1 wherein,
   (a) said booster charge means includes material in granular form, said material having substantially faster burning characteristics than said sustaining charge means; and,
   (b) said sustaining charge means includes granulated material having granule size at least twice that of the granules of said booster charge means.

4. The device defined in claim 1, wherein said tubular casing means is made of substantially unplasticized polyester material.

5. The device defined in claim 1, wherein said housing means includes,
   a cylindrical tubular portion having a plurality of spaced radial flow fluid ports formed in the wall thereof.

6. The device defined in claim 1, wherein said sustaining charge means includes,
   granulated material having the granules thereof preferably sized in the range 6 - 8 mesh.

7. The device defined in claim 1, wherein said booster charge means includes granulated material with the granules sized in the range 14 - 28 mesh.

8. The device defined in claim 1, wherein said sustaining charge means includes an alkali-metal azide compound.

9. The device defined in claim 1, wherein said booster charge means includes potassium perchlorate material.

10. The device defined in claim 1, wherein said tubular casing means is made of partially plasticized polyester material.

11. The device defined in claim 1, further comprising filter means disposed within said housing in the flow path intermediate said plenum zone and said sustaining charge means.

12. The device defined in claim 1 wherein said booster charge means includes rapid burning but non-detonating combustible material and said sustaining charge means includes combustible material having a burning rate substantially less than said booster charge means.

13. The device defined in claim 11, wherein said filter means includes:
   (a) a radially innermost layer of perforated metal;
   (b) a radially outermost layer of wire mesh screen;
   (c) at least one second layer of wire mesh screen adjacent said perforated plate and spaced from said outermost screen layer; and
   (d) at least one layer of steel wool adjacent said second screen and at least one radially superposed layer of glass fibrous material, said layers being disposed radially intermediate said outermost screen and said second screen layer.

14. A device for producing inflating fluid for use with an inflatable occupant restraint in a vehicle, the device comprising:
   (a) elongated housing means having a length at least three times the smallest transverse dimension thereof including means defining a plurality of radial flow fluid discharge ports distributed along substantially the length thereof;
   (b) gas generating means disposed within said housing means, said generating means including,
      (i) booster charge means including a first combustible chemical material;
      (ii) elongated casing means disposed within said housing means, and enclosing said booster charge means, and including an elongated tubular member extending substantially the full length of said elongated housing means, said first combustible chemical material being in direct contact with the internal surface of said tubular member; and
      (iii) sustaining charge means including a second combustible chemical material capable of producing a compressible fluid upon ignition by said booster charge means, said sustaining charge means being disposed in annular arrangement about and along the length of said casing means, said second combustible material having a burn rate substantially slower than the burn rate of said first chemical material;
   (c) means within said housing means defining an annular plenum zone communicating with each of said fluid ports, with said plenum zone being disposed about and receiving the fluid discharge from said sustaining charge means;
   (d) initiator means disposed adjacent one end of said casing means for igniting said booster charge means, whereupon activation of said initiator means, said booster charge means ignites and progressively ruptures said casing means along the length thereof and progressively longitudinally ignites the portions of said sustaining charge means adjacent said casing means for radially outward burning of said sustaining charge means; and
   (e) connector means adapted for connecting said initiator means to a source of activation.

15. A device for generating inflating fluid for use with an inflatable occupant restraint in a vehicle, said device comprising:
   (a) elongated housing means having the length thereof at least four times the transverse dimension thereof including means defining a plurality of radial fluid flow discharge ports distributed along substantially the length of said housing means;
   (b) filter means disposed within said housing means and in the fluid flow path of and adjacent each of said discharge ports;
   (c) combustible gas generating means disposed within said housing means, said generating means including,
      (i) booster charge means disposed within housing means, said booster means having a tubular casing extending the length of said elongated housing means and having a generally thin wall and said casing being formed of frangible material and having disposed therein and in direct contact with the internal surface thereof combustible chemical material which, upon ignition at one end of said casing, burns fast but without detonation and said tubular casing thereupon ruptures progressively along the length thereof;
      (ii) sustaining charge means including combustible gas generating material in granular form disposed in annular arrangement intermediate said booster means and said filter means, said sustaining charge means having a burn rate substantially slower than the said chemical material of said booster charge means;
   (d) initiator means disposed adjacent an end of said tubular casing for igniting said booster charge means whereupon activation of said initiator means, said booster charge means ignites and progressively ruptures said casing means along the length thereof and longitudinally ignites the portions of said sustaining charge means adjacent said casing means for radially outward burning of said sustaining charge means and said sustaining charge burning to form a residue of solid porous sinters;

(e) plenum means disposed intermediate said filter means and said discharge ports; and, (f) means operative for connecting said initiator means to a source of activation.

16. The device defined in claim 15, wherein said booster charge means includes granulated gas generating material having granule size in the range 14 - 28 mesh.

17. The device defined in claim 15, wherein said sustaining charge means includes combustible gas generating material in granular form with the granules sized in the range 6 - 8 mesh.

18. The device defined in claim 15, wherein said sustaining charge means includes an alkali metal azide compound.

19. The device defined in claim 15, wherein said housing means includes;
(a) a cylidrical tubular member having said ports formed therein;
(b) first closure means sealing one end of said cylindrical member including means receiving one end of said tubular booster casing;
(c) second closure means sealing the other end of said cylindrical member including,
 (i) means receiving the opposite end of said booster casing,
 (ii) means receiving said initiator and locating same adjacent said opposite end of said booster casing, and
(d) means releasably attached to said second closure means for retaining said initiator including means receiving therethrough said means for connecting to a source of activation.

20. The device defined in claim 19, wherein said retaining means is releasably attached to said second closure means.

21. A device for generating inflating fluid for an inflatable vehicle occupant restraint system comprising:
(a) housing means including tubular means having a length at least four times the transverse dimension thereof defining a plurality of radial flow discharge ports, said ports being distributed along substantially the length of said tubular means;
(b) combustible chemical gas generating material disposed in annular arrangement within said tubular means, said material being in granular form and operative upon burning to provide a residue of solid porous sinters and to produce gas;
(c) booster means received centrally within said annularly disposed generating material, said booster means comprising an elongated tubular casing extending the length of said housing means formed of frangible material and filled with combustible chemical primer material, said primer material being in direct contact with the internal surface of said tubular casing and having a burn rate substantially greater than said gas generating material such that, upon ignition of said primer material at one end of said casing, said casing is progressively ruptured along the length thereof and said annular gas generating material has the portions adjacent said casing ignited progressively along the length thereof to produce radially outward burning thereof; and, (d) initiator means disposed adjacent one end of said casing and operable in response to a source of actuation to ignite said primer material.

22. A device for producing inflating fluid for use with an inflatable occupant restraint in a vehicle, said device comprising:
(a) elongated housing means including means defining a plurality of radial flow fluid discharge ports distributed along substantially the length of said housing means;
(b) gas generating means disposed within said housing means, said generating means including,
 (i) booster charge means including fast burning but nondetonating combustible chemical material and an elongated casing means extending the length of said housing means and having a generally thin wall and formed of frangible material with said fast burning material received therein and in direct contact with the internal surface thereof;
 (ii) sustaining charge means disposed around said booster charge means, said sustaining charge means having a burn rate substantially less than that of said booster charge means and including granular material which burns to form a residue of solid porous sinters, said sustaining charge means igniting upon ignition of said booster charge means characterized by said casing means progressively rupturing along the length thereof and progressively longitudinally igniting portions of said sustaining charge means adjacent said casing means for radially outward burning of said sustaining charge means;
(c) means disposed within said housing means and defining a plenum zone communicating with said discharge ports and disposed annularly about said sustaining charge means such that, upon ignition by said booster charge means, said sustaining charge means discharges gas radially outwardly and into said plenum zone;
(d) filter means having an annular configuration and disposed about said sustaining means and receiving gas flow therefrom for discharge radially outwardly to said plenum zone;
(e) initiator means disposed adjacent one end of said casing means; and,
(f) means for connecting said initiator means to a source of activation.

* * * * *

UNITED STATES PATENT AND TRADEMARK OFFICE
CERTIFICATE OF CORRECTION

PATENT NO. : 4,109,578
DATED : August 29, 1978
INVENTOR(S) : George W. Goetz

It is certified that error appears in the above-identified patent and that said Letters Patent are hereby corrected as shown below:

Col. 4, line 23:      Ser. No. 59,191 should read 591,911.

Col. 5, line 52:      "by" should read --- be ---.

Signed and Sealed this

Fifth Day of June 1979

[SEAL]

Attest:

RUTH C. MASON
*Attesting Officer*

DONALD W. BANNER
*Commissioner of Patents and Trademarks*